Dec. 3, 1957 — T. HELLRICH — 2,814,897
ARTIFICIAL CHRISTMAS TREE
Filed Jan. 3, 1955

INVENTOR
Tobias Hellrich

Dec. 3, 1957 T. HELLRICH 2,814,897
ARTIFICIAL CHRISTMAS TREE
Filed Jan. 3, 1955 2 Sheets-Sheet 2

INVENTOR:
Tobias Hellrich
By
Patent Agent

United States Patent Office 2,814,897
Patented Dec. 3, 1957

2,814,897
ARTIFICIAL CHRISTMAS TREE
Tobias Hellrich, Schwaig, near Nurnberg, Germany
Application January 3, 1955, Serial No. 479,585
Claims priority, application Germany April 9, 1954
2 Claims. (Cl. 41—15)

The present invention relates to improvements in artificial trees, and more particularly artificial coniferous trees resembling Christmas trees.

Formerly, imitations of Christmas trees often consisted of a skeleton of wire or the like forming the tree trunk and branches around which dyed and preferably split goose or other feathers were wound and secured thereto by winding a thin wire or the like around the same. Christmas trees made of goose or similar feathers have the advantage of giving a true imitation of the needles of a natural tree. However, in making the branches of such tree it has been found impossible to hide the free end of a wire wound with feathers, thus immediately destroying the resemblance to a natural tree. Also, such freely exposed wire end was of ungainly appearance. For this reason attempts have been made to cover such wire ends by berrylike bodies which, however, again gave an unnatural impression, being too coarse a termination of the branches and contrasting too much with the thin needles of the tree, thus making the tree appear stiff and lifeless.

It is the object of the present invention to overcome the disadvantages of prior artificial trees, and particularly Christmas trees, the needles of which are imitated by the use of goose or similar feathers.

Another object of the invention is to cover or hide the ends of the wires used for making the branches by means of one or more unsplit or split feathers.

A feature of the invention for carrying out this object consists in providing the covering feathers so that their quills overlap the ends of the branches, thus permitting the use of the same fine wire which secures the split feathers on the wire skeleton also for tieing the covering feathers to the ends of the branches.

The application of feathers as a covering of the free end of the branches produces a much truer resemblance to a natural tree than a covering by berrylike bodies since a feather looks very similar to a branch of a coniferous tree and also gives the impression of a young tender sprout on the branch. Such effect may be further increased by dyeing the covering feathers in a lighter shade than the needles of the tree.

Another feature and advantage of the invention resides in the fact that the length of a branch around which a split goose feather has been wound may be shortened by the length of the feather covering the end of the branch, which, in turn, results in a considerable saving of feather material and wire permitting a less expensive production of the entire tree although the individual branches thus formed do not differ in length from those of naturally grown coniferous trees.

Another object and feature of the invention consists in animating the artificial tree and making it more lifelike by dyeing the covering feathers in different shades. Such animation of the artificial tree is aided particularly by the fact that a small air current suffices to give the covering feathers a similar vibrating movement which the branches of a natural tree carry out when blown by the wind.

Further objects, features and advantages of the present invention will be apparent from the following detailed description thereof and the accompanying drawings, in which—

Fig. 1 shows an artificial tree according to the invention; while

Figure 1:
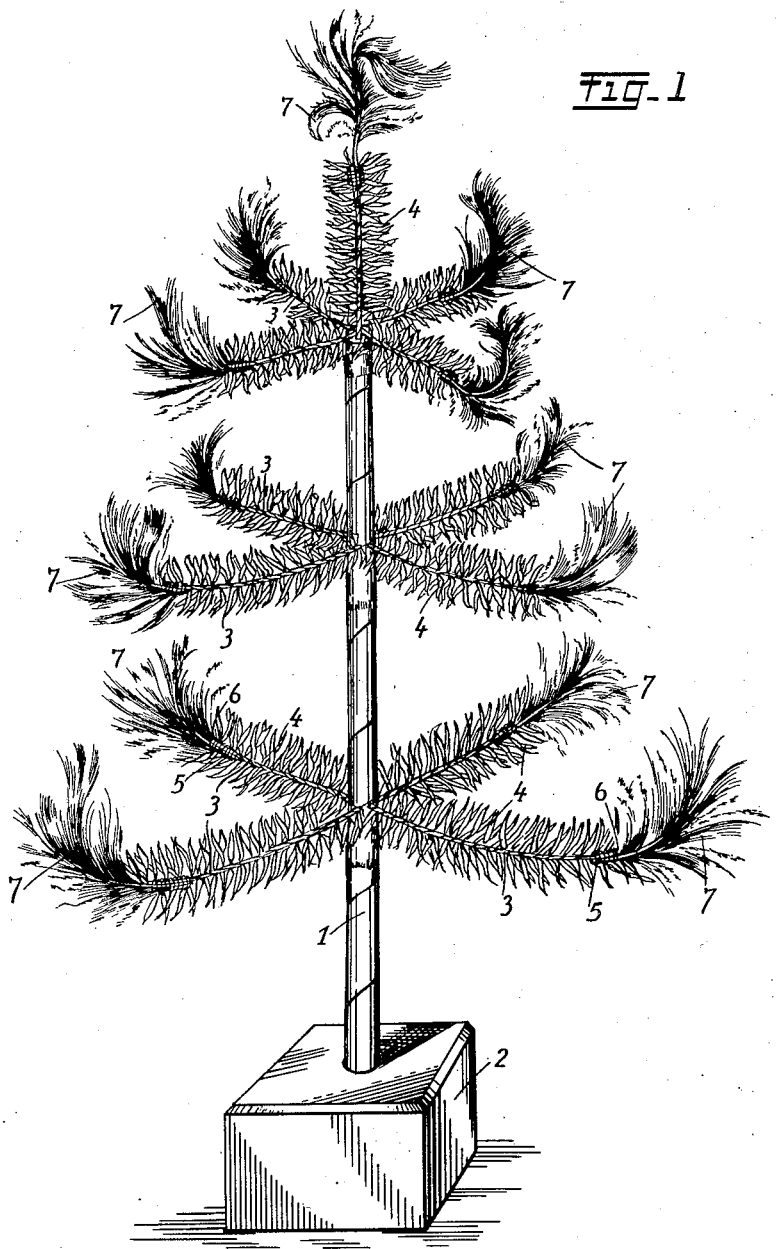

Referring to Fig. 1 of the drawings, the trunk 1 of the artificial tree is mounted in a base 2 and held thereon in an upright position. Similar to a natural tree it is provided with a series of branches, each of which is formed by a core wire member 3, the end of which facing the tree trunk is bent at an angle downwardly of the trunk 1 and secured thereto by a coil of wire wound around the trunk.

In order to give the surface of the tree trunk the appearance of being covered with natural bark, and to cover the ends of the wire members 3 as well as the wire coils thereon, a strip of paper or similar material which is dyed like bark is wound around the tree trunk 1. Further, split and dyed goose or other feathers 4 are wound around the core wire member 3 and secured thereto by a thin wire 5. The free ends 6 of the members 3 are covered by separate feathers 7 which extend from the free ends of the branches and thereby give the branches the proper length in proportion to the length of the trunk similar to a natural tree. The quills of the feathers 7 which are preferably unsplit overlap the wire ends 6 and are secured thereto by a thin wire 5 similarly as used to secure the split feathers 4. The shading in the drawings illustrates how the feathers 7 show up against the split feathers 4 by their lighter shade, thus producing the effect of young sprouts on the branches.

Figure 2:
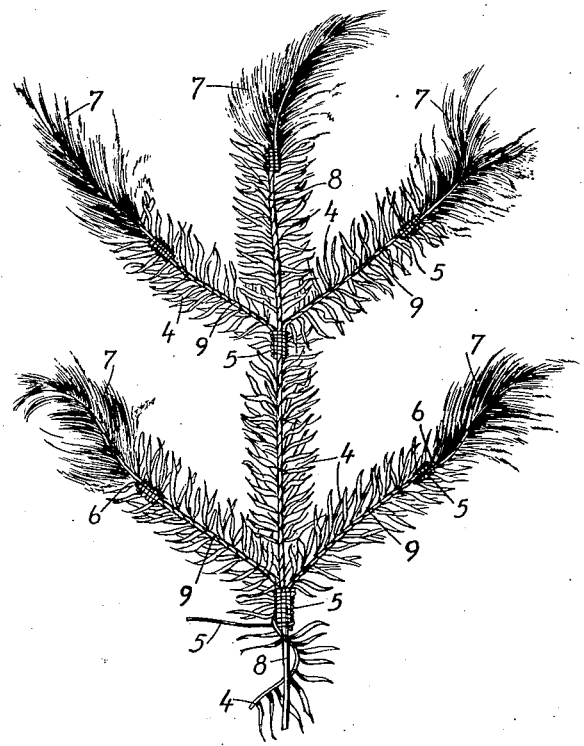
Fig. 2 shows a modified form of an individual branch thereof together with its side branches.

In place of the branches as shown in Fig. 1 it is also possible to use the kind illustrated in Fig. 2. Such branches may also be used individually, for example, as Christmas decoration. The branch shown in Fig. 2 is formed by a stiff wire 8 on which the thinner core wire members 9 are secured so as to form side branches. Otherwise the branch shown in Fig. 2 is of the same construction as those on the artificial tree shown in Fig. 1, the split and dyed feathers as well as the feathers at the ends of the side branches, and their securing means therefore being identified by the same reference numerals as used in Fig. 1.

While I have described my invention with reference to the preferred embodiments thereof, I wish to have it understood that it is in no way limited to the details of such embodiments or to the specific examples described, but is capable of numerous modifications within the scope of the appended claims. Thus, for example, the invention may also be applied to artificial trees or branches, the needles of which are made of paper, rayon, vegetable fibers, or the like.

What I claim as new is:

1. An artificial Christmas tree comprising a trunk, a plurality of branches having as supporting cores wire members, one of the ends of each wire member being mounted on said trunk, feathers secured to and twined around and along said wire members to resemble needles of a natural Christmas tree, separate end feathers extending from the free ends of said branches increasing their lengths, the quill portions of said end feathers being attached to the other, free ends of said wire members so as to cover said free wire ends.

2. An artificial Christmas tree according to claim 1, wherein said separate end feathers are of different color shades than said feathers twined around said core wire members.

References Cited in the file of this patent

UNITED STATES PATENTS

| | | |
|---|---|---|
| 1,798,991 | Vydra | Mar. 31, 1931 |

FOREIGN PATENTS

| | | |
|---|---|---|
| 431,559 | France | Oct. 19, 1911 |
| 303,270 | Great Britain | Jan. 3, 1929 |